United States Patent [19]

Peacock

[11] Patent Number: 4,785,851

[45] Date of Patent: Nov. 22, 1988

[54] VACUUM SECURITY VALVE HAVING A BUFFER VOLUME

[75] Inventor: R. Norman Peacock, Lafayette, Colo.

[73] Assignee: MKS Instruments Inc., Andover, Mass.

[21] Appl. No.: 76,714

[22] Filed: Jul. 20, 1987

[51] Int. Cl.[4] .................. F16K 31/124; F16K 31/128; F16K 31/02
[52] U.S. Cl. .................. 137/907; 251/30.03; 251/33; 251/36; 251/46
[58] Field of Search .................. 251/33, 34, 35, 36, 251/37, 30.02, 30.03, 43, 44, 45, 46, 47; 137/907

[56] References Cited

U.S. PATENT DOCUMENTS

| | | | |
|---|---|---|---|
| 1,046,236 | 12/1912 | Wagner | 251/35 |
| 1,176,535 | 3/1916 | Fulton | 251/45 |
| 2,329,001 | 9/1943 | Robinson | 251/36 |
| 3,114,532 | 12/1963 | Gray et al. | 251/30.03 |
| 3,428,290 | 2/1969 | Deans | 251/37 |
| 4,090,001 | 1/1978 | Musgrove | 251/46 |
| 4,332,368 | 6/1982 | Woloszczuk | 251/30.02 |
| 4,482,127 | 11/1984 | Hafele | 251/36 |
| 4,613,111 | 9/1986 | Paquet et al. | 251/46 |

Primary Examiner—George L. Walton
Attorney, Agent, or Firm—Gerald J. Ferguson, Jr.

[57] ABSTRACT

A vacuum security valve includes a buffer volume in a movable piston. The movable piston has two orifices communicating with the buffer volume, the first orifice communicating with a clearance volume above the piston. A flexible diaphragm is connected to the piston for separating the clearance volume from the remainder of the interior of the valve body. Another orifice, disposed to communicate with the remainder of the interior of the valve body rather than with the clearance volume, is provided in the piston wall, and also communicates with the buffer volume. A solenoid operated valve, which is normally in the opened position, communicates through the valve body with the clearance volume, and also communicates with a vent. The security valve is connected at one port to a vacuum system which is to be protected upon power failure of a vacuum pump. The other port of the security valve is connected to the lines leading to the vacuum pump. Upon failure of power to the vacuum pump, or upon shutdown, the solenoid operated valve moves to its open position, venting the clearance volume and causing movement of the piston downwardly against a seat, thereby substantially preventing influx of air into the vacuum system. The orifices in the movable piston permit equalization of pressure during venting so that the vacuum pump, vacuum pump lines, buffer volume, and clearance volume are all at ambient pressure. In another embodiment, the buffer volume is disposed outside of the valve body.

18 Claims, 6 Drawing Sheets

VACUUM SECURITY VALVE HAVING A BUFFER VOLUME

BACKGROUND OF THE INVENTION

1. Field of the Invention

The present invention relates generally to a security valve for providing a vent to the atmosphere upon power failure, ( a volume above a piston whose lower side is at vacuum, and more particularly to a vacuum security valve which includes a buffer volume in the piston.

2. Descriprion of the Prior Art

A vacuum security valve is a two way valve designed to address the following two problems associated with power failure: (a) when a mechanical vacuum pump stops, pump oil and vapor can back up into the chamber damaging components in the process; and (b) restarting a mechanical vacuum pump under vacuum imposes high starting loads which can blow motor circuit breakers or cause damage to the motor or the belts.

Existing security valves operate by venting to the atmosphere, upon power failure of a vacuum pump, the volume above a piston of the security valve whose lower side is at vacuum. The pressure differential across the piston face causes the piston to move, compressing a return spring and closing the passage from the pump to the vacuum chamber. The pump is then vented to the atmosphere through a small orifice in the piston. Upon restoration of power to the vacuum pump, the pump restarts and the venting solenoid closes. The closing of the solenoid causes closing of the vent to the atmosphere, permitting the operating pump to evacuate the volume above the piston through the orifice. When the pressure differential between the volume above the piston and the vacuum chamber becomes sufficiently small, the return spring raises the piston and opens the valve.

In European Pat. No. 148,480 to Paquet et al., a piston is shown having a channel, the channel passing within a stem of the piston. The channel connects the chamber above the piston to the pump when the valve is closed. In this device, the valve is normally closed. No buffer volume is provided between the atmosphere and the piston face having the orifice therein. A diaphragm separates the upper piston volume from a lower piston volume communicating with an orifice. The orifice is in direct communication with the atmosphere. An orifice is disposed above the piston and communicates with the enclosed volume of air above the piston. The valve is controlled by a device which is normally closed.

In U.S. Pat. No. 4,070,001 to Musgrove, a vacuum security valve is shown which includes a bellows which operates to close a port if the pumping system fails, by causing a circular plate to contact the port. A bleedhole extends through the circular plate from the peripheral edge thereof and to the interior surface of the bellows, thereby connecting the interior bellows cavity with the interior valve cavity. Air from the solenoid-controlled vent enters the bellows directly, rather than through an orifice.

A problem with the prior art valves discussed above is that, during closing of the valve upon vacuum pump failure, air flows through the orifice directly into the vacuum chamber. This pressure burst introduces unwanted air into the vacuum chamber. Such unwanted air can potentially damage ongoing processes or experiments within the vacuum chamber, as well as possibly introducing contaminants.

In the prior art devices, it would be desirable to make the single orifice arbitrarily small in order to reduce the gas burst which occurs during closing of the valve. However, the single orifice of the prior art valves cannot be made arbitrarily small to reduce the gas burst because the time required in order to vent the vacuum pump would be unduly increased.

SUMMARY OF THE INVENTION

It is therefor an object of the present invention to provide a security valve communicating with a vacuum chamber and with a vacuum pump, which avoids the problems of the prior art by greatly reducing air flow directly into the vacuum chamber during closing of the security valve.

It is another object of the present invention to provide a valve having a buffer volume which is intermediate a vacuum system and a vent valve, the buffer volume being adapted to restrict air flow from a space above a piston to the vacuum system, the space above the piston communicating with the vent.

It is a further object of the present invention to provide a valve having a solenoid operated vent valve communicating with a volume above a piston, which in turn communicates with a buffer volume via an orifice, the buffer volume communicating with the vacuum system via another orifice It is a still further object of the present invention to provide a security valve for closing a passage to a vacuum system by seating of a piston, the seating of the piston being caused by the opening of a venting valve which causes fluid to enter a space above the piston to create a pressure differential to seat the piston upon a valve seat, the piston having a moveable buffer volume associated therewith, the buffer volume having an inlet orifice communicating with a clearance volume, the clearance volume communicating with the venting valve, the buffer volume also communicating via an orifice with the vacuum side of the valve, so that upon opening of the venting valve the piston is caused to be rapidly seated, thereby sealing either the vacuum system or the vacuum pump, whereby upon seating of the valve, only a relatively small amount of air enters the vacuum system since the buffer volume orifices greatly restrict airflow from the clearance volume into the vacuum system; and a flexible diaphragm is used to permit movement of the piston while separating the clearance volume from the vacuum system so that unwanted air or other fluid cannot enter the vacuum system.

These and other objects of the present invention will be understood by those acquainted with the design and construction of such valves upon reading of the following detailed description in conjunction with the accompanying drawings.

DETAILED DESCRIPTION OF THE INVENTION

Figure 1:
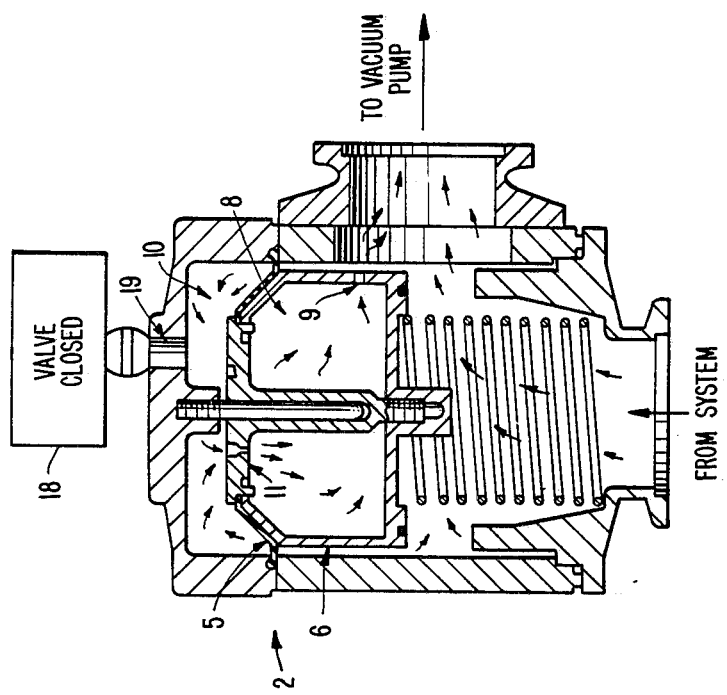
FIG. 1 is a sectional side view of a security valve according to the present invention.

As shown in FIG. 1, a security valve 2 is seen in sectional side view and is connected to a solenoid operated valve 18 by a conduit 25. The solenoid operated valve 18 communicates with a vent, the vent in a preferred embodiment communicating with the atmosphere.

The valve 2 has a clearance volume 10 disposed above the face of a flanged sleeve 12. The sleeve 12 slides along a guide rod 13, an upper end of which is fixedly connected to a bonnet 16 of the valve 2.

A piston 6 is formed by the sleeve 12 at its upper end, a conically-shaped sidewall 22 connected therewith, a generally cylindrically-shaped sidewall 23 connected to the wall 22 and a lowermost wall 24 which is connected to the wall 23. The piston 6 encloses a buffer volume 8. A lowermost end 30 of the sleeve 12 is fixedly connected to a bore 29 in the lowermost wall 24, the bore 29 being contained within an extension 27 of the wall 24. This fixation also secures the diaphragm leak-tight between the piston 6 and the sleeve 12. A lowermost portion of the wall 24 has a seating surface 32, and an O-ring 15 is retained within the seating surface 32 so that an air-tight or fluid-tight seal can be formed between the seating surface 32 and the valve seat 14. The piston 6 has an orifice 11 which communicates between the buffer volume 8 and the clearance volume 10. The piston 6 has another orifice 9 which communicates between the buffer volume 8 and the remainder of the valve interior which can communicate with the vacuum pump and with the vacuum system (indicated schematically in FIG. 1 by legends with arrows).

A flexible diaphragm 5 overlies a portion of the wall 22 of the piston 6 as seen in FIG. 1. One end of the diaphragm 5 is fixedly connected between a body portion 17 of the valve 2 and the bonnet portion 16 of the valve 2. The other end of the flexible diaphragm 5 is fixedly connected between the underside of the flange portion of the sleeve 12 and the uppermost portion of the conically-shaped wall 22 of the piston 6. The diaphragm 5 thereby separates the clearance volume 10 from the remainder of the valve 2, thereby isolating the clearance volume 10 from the vacuum pump and from the system, except for the communication between the clearance volume 10 and the buffer volume 8 by the orifice 11.

The clearance volume 10 communicates with a bore 19, the bore 19 communicating with the conduit 25 and the solenoid operated valve 18. Thus, the clearance volume 10 communicates with the vent when the solenoid operated valve 18 is in an open position. The vent is preferably to the atmosphere, although it can also be to any other fluid reservoir desired. Closing of the solenoid operated valve 18 closes off communication of the clearance volume 1 from the vent.

The valve 2 receives the piston 6 within the body portion 17. The body portion 17 is connected to an end member 33 having a valve seat 14 thereon and also having a nose piece flange 3 thereon. The body portion 17 is also fixedly connected to a body flange 4. In the embodiment shown in FIG. 1, the nose piece flange 3 communicates with the vacuum system, and the body flange 4 communicates with the vacuum pump. In the position of the piston 6 shown in FIG. 1, the vacuum pump communicates with the vacuum system via the opening 26 in the body flange 4, which in turn communicates with an adjacent opening (unnumbered) formed in the body portion 17, which in turn communicates with the interior of the body portion 17 beneath the diaphragm 5 and with the exterior portion of the piston 6 beneath the diaphragm 5. The volume beneath the wall 24 of the piston 6 communicates with a passageway formed by the interior of the end portion 33 and with a conduit formed by an interior wall 25 of the nose piece flange 3.

The end piece 33 has a ledge therein (unnumbered) receiving an end of a spring 7, the spring 7 being shown generally schematically in FIG. 1. An upper portion of the spring 7 contacts an underside of the wall 24 to resiliently bias the piston 6 to the position shown in FIG. 1. The security valve 2 of FIG. 1 is shown in the "open" position wherein the piston 6 is resiliently urged away from the seat 14 by the spring 7, thereby permitting direct communication from the vacuum system to the vacuum pump.

The security valve 2 of FIG. 1 illustrates the security valve when it is not in operation, wherein the solenoid air vent valve 18 is open, and wherein the vacuum pump, the security valve interior, and the vacuum system apparatus are all at atmospheric pressure and in communication with the atmosphere via the vent. Since there in no pressure differential across diaphragm 5, the piston 6 is held in the open position by the return spring 7.

The solenoid operated valve 18 includes a normally open vacuum valve. The solenoid operated valve 18 is supplied with power from a source (not shown) which preferably simultaneously supplies power to the vacuum pump. When power is being supplied to the vacuum pump, the solenoid operated valve 18 is also supplied with power, thereby closing the solenoid operated valve 18 and thus closing communication between the vent and the clearance volume 10.

The body flange 4 is preferably connected to fore line piping (not shown). The fore line piping is then connected to a vacuum roughing pump in the preferred embodiment. In the embodiment shown in FIG. 1, the vacuum pump is not running and no vacuum is being maintained anywhere in the system, buffer volume or clearance volume.

Figure 2:
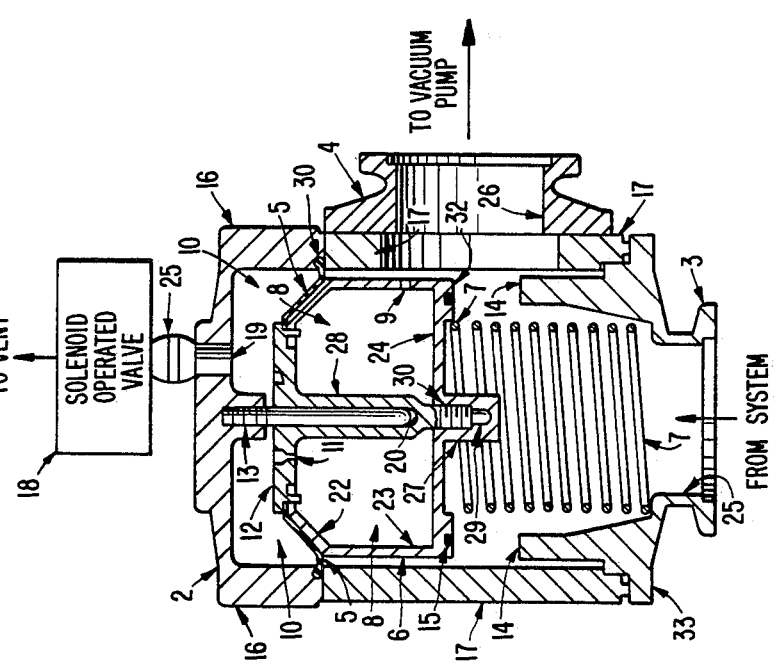
FIG. 2 is a sectional side view of the valve of FIG. 1 showing air flow through the valve during startup of the vacuum pump.

FIG. 2 shows the airflow in the valve 2 of FIG. 1 at a time just after startup of the vacuum pump from the situation of FIG. 1. In FIG. 2, the solenoid-operated valve 18 is in a closed position, sealing off the bore 19 from the vent and therefor permitting maintenance of a vacuum once same is established within valve 2. At startup, electrical power is simultaneously applied to the solenoid operated valve 18 to close the valve and is supplied to the vacuum pump thereby starting same, and initiating the evacuation of air from the fore line piping, the valve body 2, and the vacuum system apparatus (shown by the legend at the lower portion of the valve 2 in FIG. 2). The piston buffer volume 8 is evacuated during startup via the orifice 9 which is in direct communication with the interior of the valve 2. Finally, the clearance volume 18, which is located above piston 6 and which is isolated from the valve body interior by the diaphragm 5, is evacuated via the inlet piston orifice 11 which communicates with the piston buffer volume 8. After operation of the vacuum pump in the position of the valve 2 shown in FIG. 2 for a period of time, the entire interior of the system apparatus, and the entire interior of the valve 2, are maintained at the vacuum established by the vacuum pump. The interior of the piston 6 is also evacuated as is the clearance volume 10, so that the piston 6 will remain in the position shown in FIG. 2 due to the lack of a positive pressure differential over the diaphragm 5. This position and the afore-mentioned conditions constitute the nominal and normal operating condition of the valve, the vacuum pump, and the vacuum system. The arrows shown in FIG. 2 schematically illustrate the airflow throughout the valve 2 during startup operation of the vacuum pump (which occurs generally simultaneously with the closing of the valve 18).

The piston 6 of the valve 2 remains in the open position until the occurrence of a power failure. Upon the occurrence of a power failure, the vacuum pump shuts off and the solenoid operated valve 18 generally simultaneously loses power causing the normally opened valve 18 to go to its open position, thereby letting vent air in. The air flow pattern of the air within the valve 2 shortly after the occurrence of a power failure is shown in FIG. 3.

Figure 3:
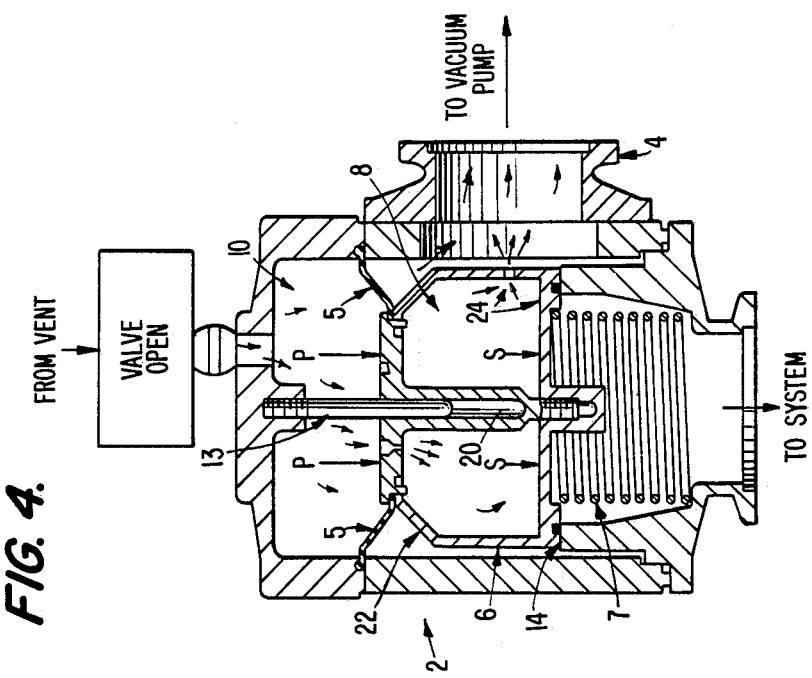
FIG. 3 is a sectional view of the valve as shown in FIG. 1 showing the airflow and the valve position at the instant of shutdown.

As seen in FIG. 3, the opening of the valve 18 permits a relatively large influx of air through the bore 19. The diameter of the bore 19 is substantially greater than that of the orifice 11, so that a substantially greater volume of air can rapidly flow through the bore 19 than can immediately flow through the orifice 11 during an electrical failure or shutdown of the system.

The airflow pattern shown in FIG. 3 illustrates the substantially immediate filling of the clearance volume 10 with air through the bore 19, so that a substantial and significant pressure exists in the clearance volume 10 over the piston 6. This causes a resultant downward force to exist on the piston 6. At the instant indicated in FIG. 3, very little air has flowed through the orifice 11 into the buffer volume 8, and therefore the buffer volume 8 exists at a significantly lower pressure than does the clearance volume 10. Therefore, a net downward force exists on the upper surface of the sleeve 12, the wall 22 and the diaphragm 5 which tends to urge the piston 6 downwardly against the spring 7. Additionally, since the buffer volume 8 permits escape of air only through the orifice 9, the buffer volume 8 at the instant shown in FIG. 3 is at a pressure which is higher than that existing in the remainder of the valve 2 beneath the diaphragm 5 and communicating with the flanges 3 and 4. Therefore, there is a significantly reduced air flow through the orifice 9 due to the relatively small pressure differential across the orifice 9 between the buffer volume 8 and the system pressure within the valve 2. As a result, very little air escapes from the buffer volume 8 into the vacuum system during shut down and electrical power failure of the system.

Thus, the presence of the buffer volume 8 significantly reduces the introduction of air or other fluid into the vacuum system during power failure or shut down of the vacuum pump as compared with the prior art devices. The buffer volume also permits the use of a relatively large diameter bore 19 to permit a relatively rapid and large air pressure buildup over the piston 6 so as to forcefully and rapidly urge the piston 6 downwardly against the spring 7 until the piston 6 seats. The faster the piston 6 moves toward the seated position, the smaller the amount of air or other fluid which enters the vacuum system. Seating of the piston 6 against the seat 14 closes off all air flow to the vacuum system. The presence of the buffer volume 8 furthermore permits a relatively gradual buildup of pressure within the fore line piping and vacuum pump itself during shutdown, thereby avoiding unnecessary shock or sudden pressure buildup, due to the restrictions to air flow caused by the orifices 9 and 11. The valve construction shown in FIGS. 1–3 has the further advantage that, due to the presence of the buffer volume 8 and resultant diminished air flow in the volume adjacent the seat 14, the O-ring 15 and seat 14 are kept relatively free of contaminants. This should greatly extend the life of the valve between required cleaning and repair or replacement, since the internal seating parts are maintained in a relatively cleaner environment throughout the operation of the valve once it is installed in the system.

From the position shown in FIG. 3, the pressure rapidly builds in the clearance volume 10 until the resultant force on the piston 6 exceeds the net force caused by the spring 7 acting against the pressure and acting against the weight of the piston 6. As the pressure rapidly builds in the clearance volume 10, the piston 6 along with the rigidly attached sleeve 12 moves toward the closed position (shown in FIG. 4) with the sleeve 12 sliding along the guide rod 13. During this brief time interval, air flows from the clearance volume 10 through orifice 11, and into the piston buffer volume 8 thereby slowly building pressure within the piston buffer volume 8. Air also leaks out of the buffer volume 8 into the valve body via the orifice 9, as explained hereinabove. Upon closing, a vacuum-tight seal is formed between the piston 6 and the valve seat 14 by the O-ring 15. As compared with the prior art devices, the time required in order to vent the vacuum pump according to the present invention remains essentially unchanged, due to proper selection of size of the inlet orifice 11 and outlet piston orifice 9. This maintenance of comparable required times to vent the vacuum pump (between the valve 2 of the present invention and the prior art devices) is achieved while simultaneously achieving significant reductions in closing gas burst pressure (to the vacuum system) and while achieving a correspondingly significant reduction in the quantity of air flow into the vacuum system, as compared with the prior art devices.

Figure 6:
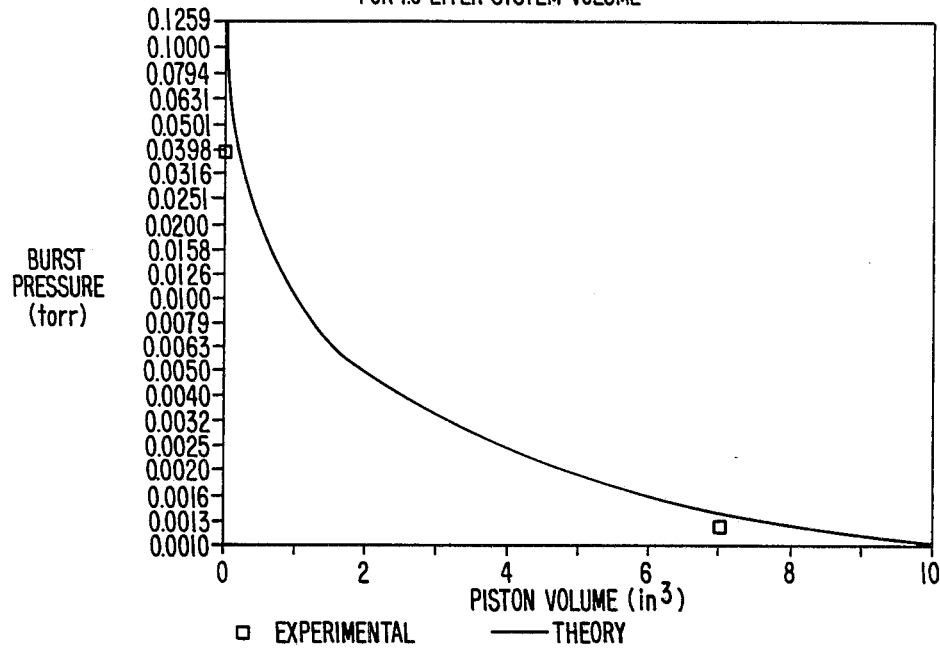
FIG. 6 is a graph of the burst pressure versus piston volume for a security valve closing, showing the air pressure resulting in the vacuum system according to the present invention.

Tests and theoretical studies conducted indicate an approximately 30-fold reduction in the size (magnitude) of the gas burst associated with the valve closing as compared with the prior art devices. FIG. 6 illustrates the closing air burst pressure as a function of piston volume, and is discussed further hereunder. The selection of the sizes of the orifices 9 and 11 are design considerations, and may be selected to achieve specific results desired, as discussed above, by one having skill in the vacuum security valve art.

Figure 4:
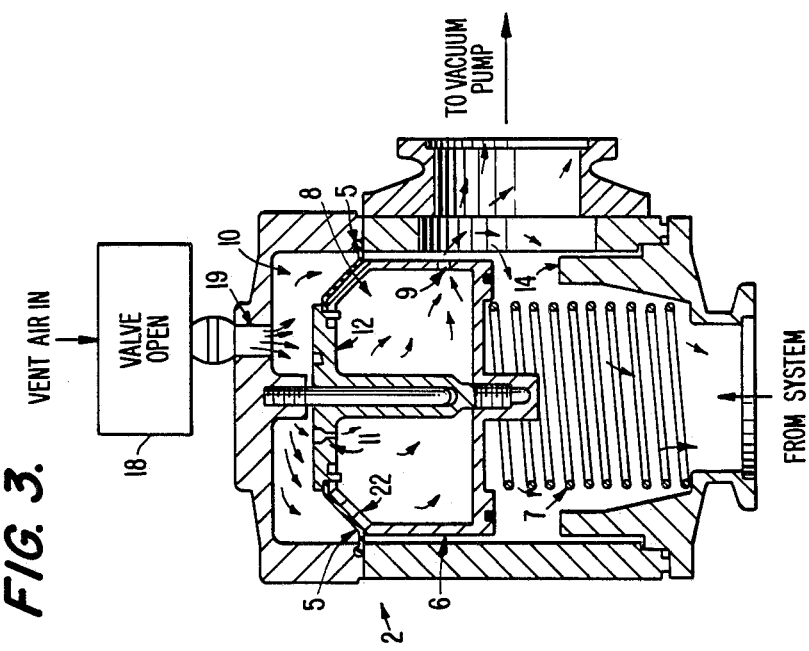
FIG. 4 is a sectional side view of FIG. 1 showing the valve in the seated position and showing the air flow occurring in the system at the instant of seating of the valve.

FIG. 4 shows the valve of FIG. 3 immediately after seating of the piston 6 against the seat 14. As seen in FIG. 4, air continues to flow into the buffer volume 8 and into the fore line piping to the vacuum pump through the flange 4. As seen in FIG. 4, the downwardly-acting pressure in the clearance volume 10 is indicated by arrows P. The pressure acting upon the underside 24 of the piston 6 is negligible, since the nose piece flange 3 is under vacuum. The resultant force maintains the seating of the piston 6 against the resistance of the spring 7, which is seen as being compressed in FIG. 4.

The diaphragm 5 in FIG. 4 is almost completely separated away from the conically-shaped wall 22. The flexible nature of the diaphragm 5 permits the movement of the piston 6 along the guide rod 13. As seen in FIGS. 3 and 4, since the flange 3 is disposed directly below the piston 6 and is connected to the vacuum chamber, and since the side port defined by the flange 4 is connected to the vacuum, an advantage arises in that the pressure differential across the diaphragm 5 acts only for a brief moment during closing of the valve seat and also during opening of the valve seat, rather than continuously. That is, the pressure differential across the diaphragm 5 exists only until equilibrium is re-established in the system, thereby reducing long term stress effects on the diaphragm. Other arrangements are, however, also contemplated as being within the scope of the present invention.

Figure 5A:
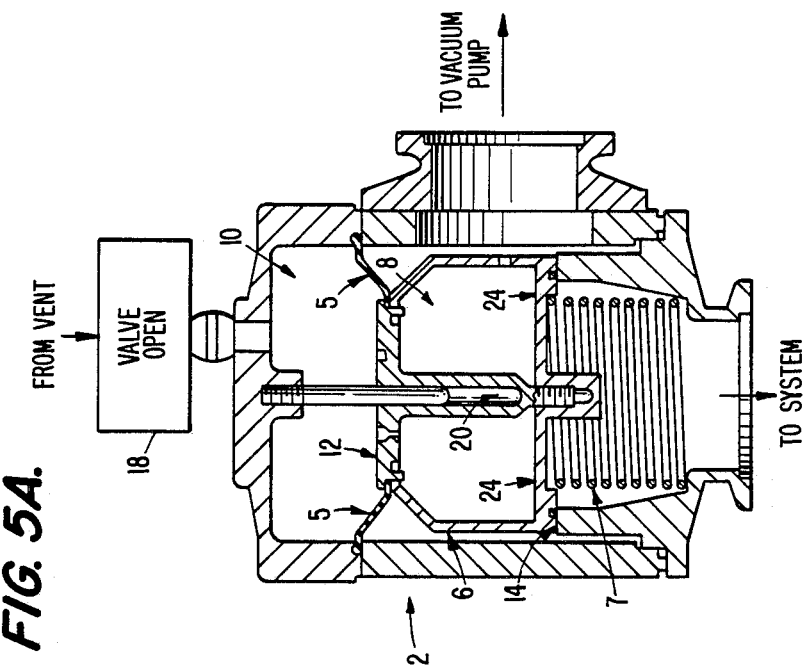
FIG. 5A is a side sectional view of the valve as shown in FIG. 1, showing the condition of the valve during an opening sequence.
Figure 5:
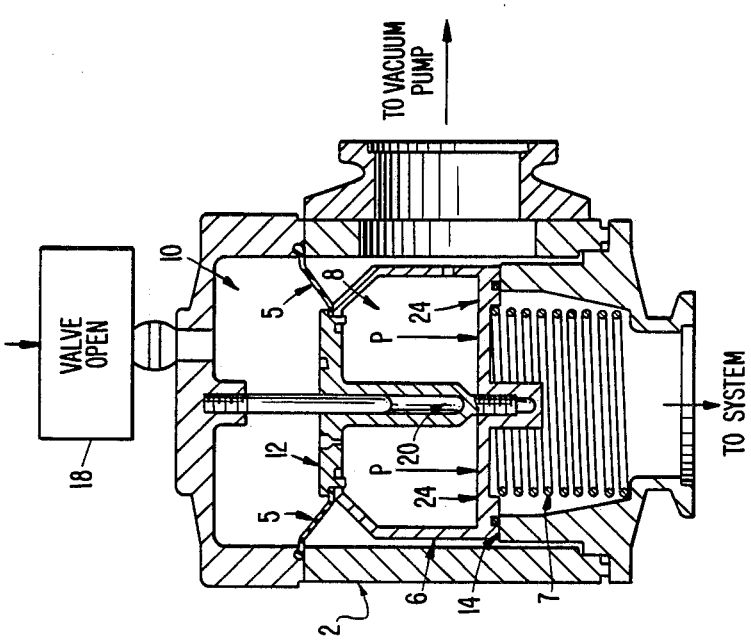
FIG. 5 is a side sectional view of the valve as shown in FIG. 4, showing the seated valve at a time when equilibrium has been reached in the system after shutdown.

FIG. 5 illustrates the valve 2 in the seated position and where equilibrium has been reached and the fore line, buffer volume 8 and clearance volume 10 are all at atmospheric pressure, so that no pressure differential exists across the diaphragm 5. The downwardly-acting pressure differential at this point now exists across the piston wall 24, as indicated by the downward arrows P in FIG. 5. The downwardly-acting pressure P across the piston wall 24 causes a resultant downward force which maintains the seating of the piston 6 against the resistance of the spring 7. Thus, the vacuum system is maintained at a relatively high level of vacuum due to the seating of the O-ring 15 and the piston seating surface 32 against the valve seat 14. The rest of the system, however, is maintained at atmospheric pressure and the vent remains in communication with the clearance volume 10 since the valve 18 remains open during failure or shutdown of the vacuum pump system.

The opening sequence for opening the valve 2 on startup of the vacuum pump and on closure of the solenoid operated valve 18, is as follows. This opening sequence is described with reference to the position of the piston 6 shown in FIG. 5A. Upon the restoration of power, the vacuum pump is started and the solenoid air vent valve 18 is closed. The fore line piping, the valve body interior, the buffer volume 8, and the clearance volume 10 are all initially at atmospheric pressure, having been previously vented by the opening of the valve 18 to the vent. The system apparatus, disposed beneath the piston 6 in FIG. 5, is still at vacuum, being isolated by the piston 6, the O-ring 15, and the valve seat 14.

The vacuum pump then evacuates the fore line, the valve body interior, the buffer volume 8 and the clearance volume 10. When the pressure differential across the piston 6 is sufficiently reduced, the piston 6 is pushed to the open position by the return spring 7, thereby connecting the vacuum pump to the system apparatus. The force generated by the return spring 7 is chosen such that the piston 6 will not open until the fore line pressure has been lowered to a predetermined safe limit.

The prior art devices, as well as the present valve having a buffer volume, produce gas bursts of approximately equal size upon opening. However, since the vacuum pump is running during this time in all of these devices, these gas bursts are relatively quickly pumped out and are not nearly as harmful as would a large air burst which (on the prior art devices) is produced on closing of the valve.

The valve embodiment shown in FIGS. 1-5 illustrates the preferred embodiment. Specific characteristics of this embodiment which are especially advantageous are discussed as follows. First, there are no sliding seals, the isolation between the piston top and the piston bottom being achieved by a flexible diaphragm seal which is clamped in place by the valve body on its outer diameter, and by the sleeve/piston interface on the inner diameter. Second, the moving parts (the guide rod 13 and sleeve 12) are isolated from the "dirty" side of the piston 6 which is exposed to the vacuum system. The isolation of the sliding parts should promote long valve life and reliability. Thirdly, the port directly below the piston 6 (in the embodiment of FIGS. 1-5) is connected to the vacuum chamber, and this arrangement provides a relatively greater piston area across which a pressure differential can act as compared with the alternative design, wherein a pressure differential "X" exists only over a substantially doughnut-shaped area defined by the valve body on the outside diameter and the valve seat on the inside diameter (as may be seen in the embodiments of FIGS. 7 and 8 in the present application). Additionally, and as mentioned hereinabove, the pressure differential "X" across the diaphragm 5 exists only for a brief time interval during closing and opening rather than continuously, thereby reducing long term stress effects upon the diaphragm 5.

In the preferred embodiment, it has been discovered that the ratio of the buffer volume 8 to the clearance volume 10 (when the valve is open) is not an important design parameter for operability, but rather the optimum size of the buffer volume 8 is dictated by several considerations. These consideration include the size of the system apparatus and fore line volumes, the valve mechanics, and customer requirements. Such multiple dependence hinders expression of the buffer volume in terms of any single equation or ratio. The theory which is useful in determining optimum buffer volume size can be determined, for example, from the diagram shown in FIG. 10 (discussed hereunder) together with analysis of same by the laws of fluid dynamics, heat transfer, and the laws of physics relating to conservation of energy, momentum and mass. These are known to those having skill in the vacuum valve art.

In a preferred embodiment, for a nominal two-inch valve 2, the solenoid air vent valve 18 has an orifice size of 1/16 inch, the orifice 11 has an internal diameter of 0.055 inch, and the outlet piston orifice 9 has an internal diameter of 0.044 inch.

Also in a preferred embodiment, the clearance volume 10 has a range of 2-6 cubic inches, and the buffer volume 8 has a preferred range of 3-7 cubic inches. All of the foregoing dimensions are given for a nominal two inch valve. The vacuum pump volume in the preferred embodiment should preferably be minimized by installing the security valve 18 as close as possible to the roughing or vacuum pump.

In the preferred embodiment, the spring should be preloaded such as to minimize the preloaded force of the spring, upon expansion thereof, to that amount just required to hold the piston 6 in its desired top position, plus a factor of safety as desired. This "preload" compression can be specified after the weight of the piston is known. To reduce the difference between the spring force in the open and closed positions, the spring should be as long as space permits, and the spring rate minimized. The spring must be of adequate strength to overcome both gravitational and frictional forces. As to the piston mass, it should preferably be minimized as far as possible. A range of 0.2 lbm or less is preferred. The piston area is preferably in the range of 2.5-3.5 square inches.

While preferred dimensions have been given for a nominal two inch valve, it will be understood that the present invention is not limited thereto, but may encompass all variations of the foregoing which would be made by one having skill in the valve arts.

FIG. 6 is a graphical illustration of the burst pressure, as measured in Torr, versus the piston volume measured in cubic inches. Two experimental points are listed on the graph. Also shown on the graph is a theoretical curve which relatively closely follows the experimental results. The theory used in the actual design of the valve is discussed further hereunder with reference to FIG. 10. As compared with the prior art devices, tests and theoretical studies indicate that the closing burst size is reduced by a factor of approximately 30.

Figure 7:
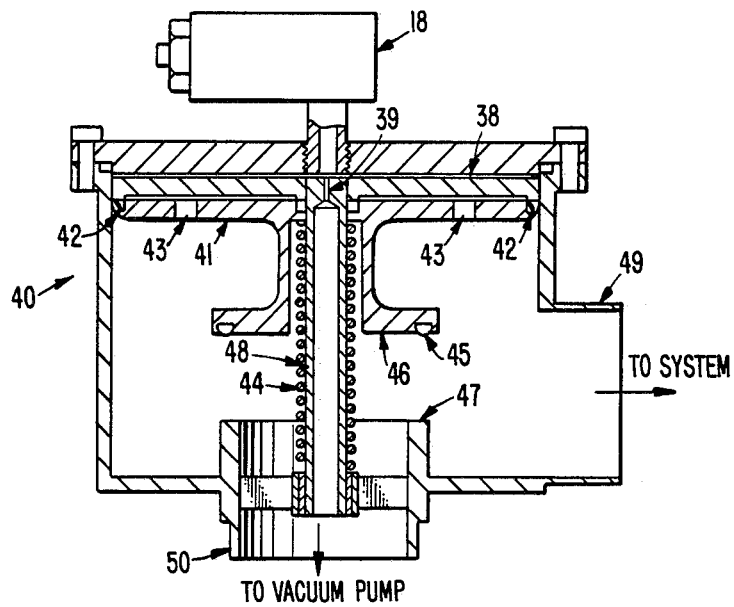
FIG. 7 is a side sectional view of another embodiment of a security valve, having a sliding O-ring sealed valve, without a buffer volume chamber.

The valve 40 shown in FIG. 7 is another embodiment showing a valve having a sliding O-ring seal 42, and wherein the piston is disposed so as to seat over that conduit which leads to the vacuum pump rather than that conduit which leads to the vacuum system. The side flange 49 leads to the vacuum system in this embodiment.

The valve 40 of FIG. 7 has a piston 41 which is slidable along a guide rod 48. A spring 44 resiliently biases the piston 41 upwardly. The piston 41 has bores 43 therein for permitting passage of fluid therethrough. The piston 41 has a lower surface 46. The lower surface 46 of the piston 41 fixedly receives an O-ring 45 therein for seating against a seating surface 47 of a flange 50. An opening 39 communicates with the fluid above a piston face 38 and with the fore line piping, serving a similar function as does the aperture 9 in the embodiment of FIGS. 1-5.

While a buffer volume is not shown in FIG. 7, it is contemplated as being within the scope of the present invention to use a piston having a buffer volume as shown in FIG. 1 in the arrangement of FIG. 7 including the particular connection to the vacuum pump and to the vacuum system, as well as the particular lower piston shape and guide rod support. It is additionally contemplated that the sliding 0-ring seal 42 of the embodiment of FIG. 7 could be used instead of the diaphragm 5 in the embodiment shown in FIG. 1, with the shape of the piston 6 of FIG. 1 being suitably modified, within the level of skill in the art, to accommodate this. Conversely, it is contemplated to use the piston shape and arrangement of FIG. 1 for the upper piston portion of the piston 41 of FIG. 7, so that a buffer volume and suitable air flow arrangement similar to FIG. 1 could be used in the embodiment according to FIG. 7.

Figure 8:
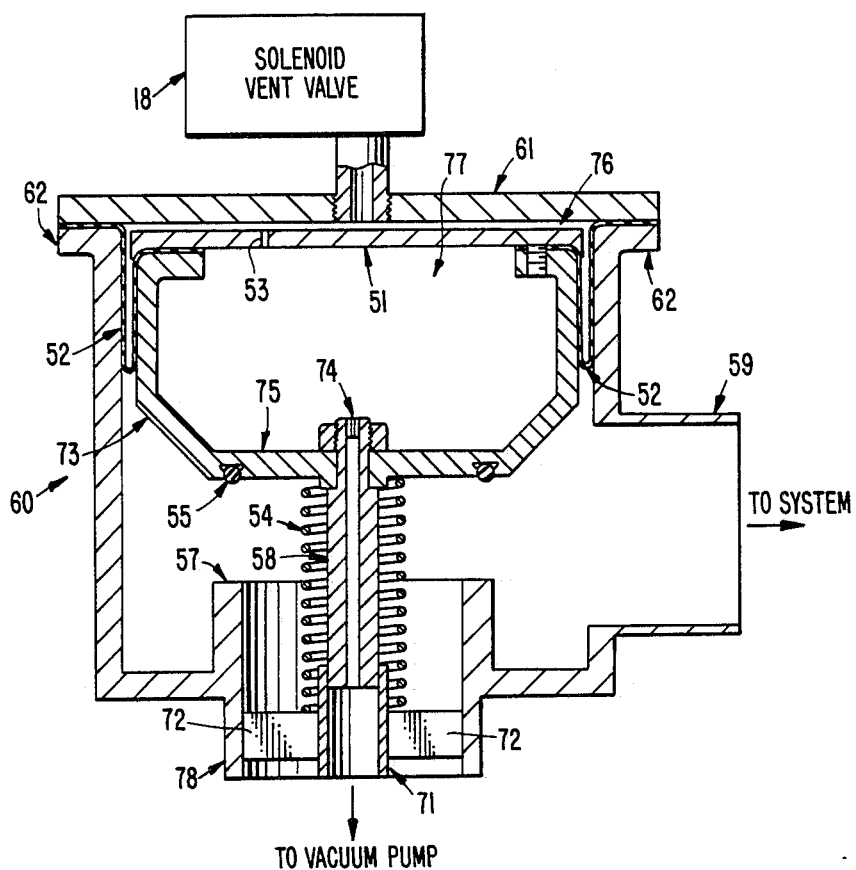
FIG. 8 is a sectional side view of another embodiment of a security valve wherein the valve seats upon a passageway leading directly to the vacuum pump and wherein a rolling diaphragm seal is used.

FIG. 8 shows in side sectional view another embodiment of a valve 60, which also has a solenoid operated vent valve 18. The mounting arrangement to the vacuum pump and to the vacuum system is similar to that shown in FIG. 7, with a bottom flange 70 being attached to the fore line communicating with the vacuum pump, and with a side flange 59 communicating with the vacuum system. A guide rod 58 is slidably received within a guide sleeve 71. The guide sleeve 71 is connected to the flange by arms 72. A return spring 54 is used to return a piston 73 to its open position as seen in FIG. 8.

The piston 73 has an upper piston wall 51 and a lower piston wall 75. The upper piston wall 51 has an orifice 53 therein, serving a similar purpose to orifice 11 of FIG. 1. The lower piston wall 75 has an orifice 74 therein which communicates with the fore line piping of the vacuum pump, and which corresponds in function to orifice 9 of FIG. 1. The lower wall 75 additionally has an O-ring 55 fixed thereto for forming an air-tight seal against the valve seat 57. The piston 73 has a buffer volume 77, and a relatively small clearance volume 76 is provided over the top piston wall 51.

The valve 60 has a top wall 61 fixed to a flange 62, between which is disposed one end of a rolling diaphragm 52. The other end of the rolling diaphragm 52 is fixed between the sidewall of the piston 73 and the top wall 51. The nature and function of the rolling diaphragm 52 is similar to that of the flexible diaphragm 5 of FIG. 1. It is noted herein that a rolling diaphragm such as diaphragm 52 of FIG. 8 could be used instead of the flexible diaphragm 5 in the embodiment of FIG. 1. Conversely, a diaphragm such as the diaphragm 5 of FIG. 1 could be used instead of the rolling diaphragm 52 in the embodiment of FIG. 8. All such variations and modifications are contemplated as being within the scope of the present invention. In the embodiment according to FIG. 8, however, the sliding components are exposed to contaminants since they are on the vacuum side of the piston. Nonetheless, such arrangement has the advantages attributable to the reduced burst pressure such as is described with regard to the embodiment of FIGS. 1-5.

Figure 9:
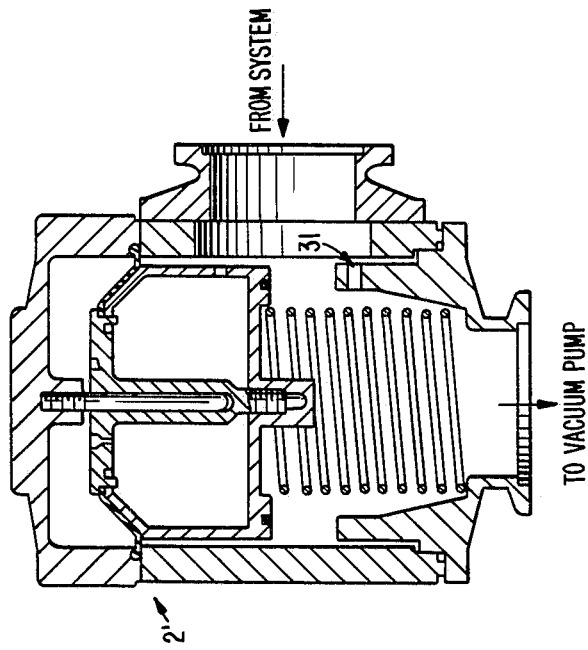
FIG. 9 is a side sectional view of another embodiment of a valve which is similar to the valve of FIG. 1 except for reversal of connections to the vacuum pump and the vacuum system, and an additional orifice used to provide a soft start feature in the security valve.

An automatic soft-start valve 2' is seen in FIG. 9 this embodiment being virtually identical to that of FIGS. 1-5 but with the further addition of a bypass port 31, and with the connections to the vacuum pump and vacuum system being reversed. That is, in FIG. 9 the bottom flange is connected to the fore line piping which, in turn, communicates with the vacuum pump, while the side flange communicates with the vacuum system. Additionally, the solenoid operated air vent valve 18 of FIG. 1 has been completely eliminated in the embodiment according to FIG. 9.

The valve 2' as shown in FIG. 9 can be used to throttle the roughing or vacuum pump during initial evacuation. A soft-start valve 2' as shown in FIG. 9, installed in the roughing line, closes very quickly upon opening an isolation valve to the pump. Initial pumpdown then takes place through the small bypass port 31 with, little turbulence generated in the vacuum chamber. The valve 2' also maintains a lower pressure at the inlet of the vacuum pump, minimizing oil blow-through to the atmosphere. The roughing time is extended thereby. When the differential pressure across the piston reaches a preset small value, the valve 2' opens automatically leaving the pumping line with a minimal restriction for the balance of the roughing or pumping process.

In the embodiment shown in FIG. 9, the rate of the initial pumpdown can be controlled by appropriate selection of the size of the bypass port 31. The pressure differential at which the valve will open can be controlled by varying the strength of the return spring and by varying the area of the piston. Time for piston opening is also influenced by piston and clearance volumes along with the diameters of the piston inlet and outlet orifices.

Figure 10:
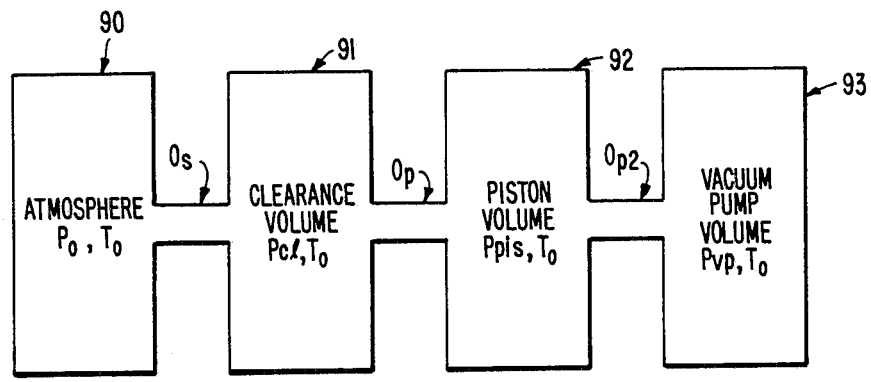
FIG. 10 is a schematic illustration of a four-volume system used to form the basis of theoretical calculations for a security valve having a buffer volume according to the present invention.

FIG. 10 shows schematically a theoretical model which is useful for analyzing the security valve fluid dynamics, and which was used in the preparation of the theoretical curve of FIG. 6 discussed hereinabove. The block 90 represents the atmosphere at a given pressure $P_o$ representing atmospheric pressure, and temperature $T_o$ representing atmospheric temperature at ambient values. The air flows through the opening $O_s$ into the clearance volume indicated by block 91.

The clearance volume at block 91 has air therein at a pressure $P_{c1}$, and at a temperature of $T_o$. The clearance volume communicates through an opening $O_{p1}$ with a chamber 92 which represents the piston buffer volume. The piston buffer volume is at a pressure $P_{pis}$, and at a temperature of $T_o$.

The piston buffer volume 92 communicates with the vacuum pump volume 93 through a schematically indicated opening $O_{p2}$. The vacuum pump volume is at a pressure of $P_{vp}$, and at a temperature of $T_o$.

The pressure values, temperature values, and communicating orifice parameters are theoretical values which are representative of the true system but in a simplified form for computational analysis. The primary objective of the analysis is to be able to specify the pressure, temperature, density, and air mass flows as a function of time, given a set of valve input parameters.

Each opening or orifice indicated in FIG. 10 throttles the air creating a pressure drop across its boundaries. Throttling of gas is inherently an irreversible process, thus the entropy of the air will increase as it makes its way into the vacuum pump chamber indicated at 93. However, localized air flow up to the throat of any given orifice is primarily isentropic and can be accurately described using one-dimensional, isentropic compressible gas flow equations. The irreversible phenomenon occurs as a sudden expansion of the gas upon exiting the respective orifice into the downstream volume. Thus, the theoretically well-known gas flow equations are generally sufficient for specifying the mass rate of flow into an orifice, but they alone are not capable of specifying the resulting downstream volume pressure. Some additional information is needed.

The principles of conservation of energy, of conservation of momentum, of ideal gas law behavior, knowledge of the sizes of the given chamber volumes, assumption of negligible air velocities away from the orifices, and fluid flow continuity supply the additional required information to sufficiently completely specify the resulting downstream pressure.

The principle of conservation of energy, along with the assumptions of negligible air velocity before and after transit through the orifice and no heat transfer to or from the flowing air (adiabatic conditions), results in the upstream and downstream air temperatures being the same. It is noted that this is not true for the air while it is flowing through the orifice, since it will have a substantial portion of its enthalpy contained in kinetic energy as expressed in the kinetic energy term $\frac{1}{2}MV^2$, and hence the flowing air will have a lower temperature.

As the negligible velocity assumption is crucial to specifying the downstream temperature, some elaboration is in order. Since the diameter of the orifices is so much smaller than the overall dimensions of the volumes before and after each orifice, it can be assumed that the velocity of the air is zero while it is contained in any one of the volumes. This is a normally reasonable assumption if the orifice diameter is no more than 1/10 the diameter of the upstream and downstream volumes. This criterion is satisfied in the present application as the orifice diameters are preferably on the order of 0.04 inches while the chamber diameters are approximately 2 inches, thereby yielding a ratio of diameters of 1/50.

The temperature of the flowing gas rises back to its initial level prior to passing through the orifice as its kinetic energy is converted back into internal energy. Thermodynamic curves illustrating this process are well-known.

From the above-mentioned well-known gas flow equations, the amount of mass contained in the downstream volume is known, the temperature of the air is the same as the upstream temperature, and the volume of the downstream chamber is a given value. There is therefore sufficient information to calculate the downstream pressure assuming ideal gas law relationships.

A listing of assumptions and basic equations used is as follows:

Steady flow (only for a small increment of time for computational purposes, then the state properties will be updated)
One-dimensional flow
isentropic flow
compressible fluid flow
ideal gas properties and behavior
no heat transfer to or from the air
negligible upstream and downstream air velocities away from the orifice.

Air pressure, temperature, density, flow rates, and piston position can be studied at any point in time for each of the control volumes by suitable computational analysis, thereby allowing for a complete investigation of the effect of the various valve input parameters such as orifice size, volume sizes, piston area and mass, return spring preload and rate, vacuum pump speed, fore line volume and system apparatus volume.

The basic equations used in light of the above are well known to anyone in the field of gas fluid flow dynamics. The calculations are conducted for the situation upon the closing of the valve, and separately also for the opening of the valve. During opening of the valve, the solenoid air vent valve 18 is closed, and thus there is no flow from the atmosphere to the clearance volume, however, the vacuum pump is on and therefore air is being removed from the vacuum pump volume and would be schematically indicated by placement of an orifice on the right hand portion of block 93 to indicate a quantity of air which is being removed from the system. Numerical methods can then be used to calculate the above-mentioned quantities for relatively small increments of time. Such a numerical model as discussed above is useful for determining desired sizes of various components and desired quantities in order to meet required design criteria. Such detailed equations and theoretical model, while useful for design purposes, is not necessary for an understanding of the present invention and accordingly is not further developed herein.

Figure 11:
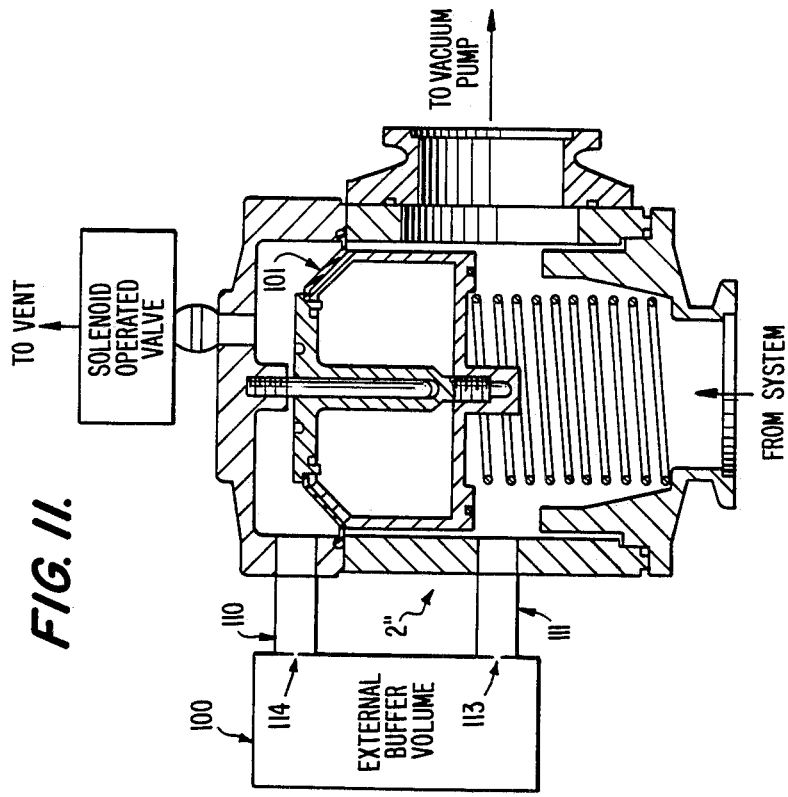
FIG. 11 is a side sectional view of an alternative embodiment wherein the buffer volume is disposed outside of the valve body.

FIG. 11 shows an external buffer volume schematically indicated as external buffer volume 100. The external buffer volume 100 can be provided by any suitable chamber device, having a pair of conduits 110, 111 which communicate with the interior of the valve 2''. The valve 2'' has a piston 101 which is impermeable to passage of air therethrough. The external buffer volume 100 communicates with the conduits 110 and 111 via respective orifices 114 and 113.

The orifices 114 and 113 correspond respectively to the orifices 11 and 9 of the embodiment of FIG. 1, and serve substantially the same function. The diaphragm shown in FIG. 11 still separates the upper valve interior from the lower valve interior.

The foregoing described embodiments have been included herein for illustrative purposes only, and are in no way intended to limit the scope of the present invention. Modifications to these embodiments, and further modifications within the scope hereof, will be apparent to those skilled in the art to which the present invention pertains.

What is claimed is:

1. A vacuum security valve, comprising:
   a valve body having an interior, a selectively openable vent means connected to a fluid source at a predetermined pressure, a first port means, and a second port means;
   a normally open, movable valve piston means for movement within said valve body between a first, open, position and a second, closed position; said first and second port means being in communication when said movable piston means is in said first, open, position; said movable piston means blocking communication between said first and second port means when in said second, closed, position;
   a valve seat means for seating of said movable valve piston means in said second, closed, position to close communication between said first and second port means;
   said selectively openable vent means being openable, when said interior of said valve body is under a vacuum pressure less than said predetermined pressure of the fluid source, to cause movement of said movable piston means from said first, open position to said second, closed position;
   said movable valve piston means having an internal buffer volume, a first orifice, and a second orifice which communicates with said first orifice via said internal buffer volume;
   a blocking means for preventing fluid communication between said selectively openable vent means and said second port means;
   said buffer volume communicating with said interior of said valve body via said second orifice;
   said selectively openable vent means being in communication with said first orifice;
   said buffer volume being sufficiently large that, under said vacuum pressure inside said valve body and upon opening of said selectively openable vent means, said first port means is closed by said movable valve piston means before significant fluid leakage occurs from said buffer volume via said second orifice;
   whereby, upon opening of said selectively openable vent means, the fluid from the fluid source pressurizes the movable valve piston means to cause the piston means to close the first port means while at the same time the fluid passes through the first orifice, the buffer volume and the second orifice of the movable valve piston means to initiate venting of a device adapted for connection to said first or second port means, the time for initiation of venting being significantly increased with respect to the time for the piston means to close the first port due to said buffer volume.

2. A valve as claimed in claim 1, further comprising a clearance volume between a top of said movable piston means and said selectively openable vent means.

3. A valve as claimed in claim 2, further comprising a flexible diaphragm for connecting said movable piston to said valve body.

4. A valve as claimed in claim 3, wherein said flexible diaphragm forms a fluid-tight seal about said piston so as to divide an internal volume of said valve body to permit maintenance of differing fluid pressures on opposite sides of said flexible diaphragm.

5. A valve as claimed in claim 1, wherein said blocking means comprises a flexible diaphragm connecting said movable piston to said valve body.

6. A valve as claimed in claim 5, wherein said flexible diaphragm forms a fluid-tight seal about said piston so as to divide an internal volume of said valve body to permit maintenance of differing fluid pressures on opposite sides of said flexible diaphragm.

7. A valve as claimed in claim 6, wherein said first orifice communicates with an internal portion of said valve body which is in communication with a first side of said flexible diaphragm, and said second orifice communicates with a second internal portion of said valve body which is in communication with the other side of said flexible diaphragm.

8. A valve as claimed in claim 5, wherein said flexible diaphragm is a generally disc-shaped annular member.

9. A valve as claimed in claim 5, wherein said flexible diaphragm is an O-ring sliding seal which is disposed to prevent fluid flow between an outer wall of said movable piston means and an internal wall of said valve body.

10. A valve as claimed in claim 5, wherein said flexible diaphragm means is a rolling diaphragm.

11. A valve as claimed in claim 1, wherein said valve body includes an opening therein, said opening in said valve body communicating with said selectively openable vent means, said selectively operable vent means including a selectively operable valve means which in turn communicates with a vent means;
   whereby opening of said valve means enables communication between said interior of said valve body with said vent means.

12. A valve as claimed in claim 1, wherein said first port means is connected to a vacuum system.

13. A valve as claimed in claim 1, wherein said second port means is connected to a vacuum pump.

14. A valve as claimed in claim 1, wherein said first port means communicates with an underside of said movable piston means when said movable piston means is in a seated position against said valve seat means.

15. A valve as claimed in claim 14, wherein said first port means communicates with a vacuum system.

16. A valve as claimed in claim 14, wherein said second port means communicates with a vacuum system.

17. A valve as claimed in claim 1, further comprising a guide rod means having one end fixed to said valve body for guiding movement of said movable piston means within said valve body.

18. A vacuum security valve, comprising:
- a valve body having an interior, a selectively openable vent means connected to a fluid source at a predetermined pressure, first port means and a second port means;
- a normally open, movable valve piston means for movement within said valve body between a first, open, position and a second, closed, position; said first and second port means being in communication when said movable piston means is in said first, open, position; said movable piston means blocking communication between said first and second port means when in said second, closed position;
- a valve seat means for seating of said movable valve piston means in said second, closed, position to close communication between said first and second port means; and
- said selectively openable vent means being openable, when said interior of said valve body is under a vacuum pressure less than said predetermined pressure of the fluid source to cause movement of said movable piston means from said first, open, position to said second, closed, position;
- an external layer buffer volume communicating with an interior of said valve body;
- a blocking means for preventing fluid communication between said selectively openable vent means and said second port means;
- said external buffer volume communicating with the interior of said valve body via a pair of orifices, a first one of said orifices communicating with said selectively openable vent means and with an interior portion of said valve body above said blocking means, and the other one of said orifices communicating with the interior of said valve body below said blocking means;
- said buffer volume being sufficiently large that, under said vacuum pressure inside of said valve body and upon opening of said selectively openable vent means, said first port means is closed by said movable valve piston means before significant fluid leakage occurs from said buffer volume via said second orifice;
- whereby, upon opening of said selectively openable vent means, the fluid from the fluid source pressurizes the movable valve piston means to cause the piston means to close the first port means while at the same time the fluid passes through the first orifice, the buffer volume and the second orifice to initiate venting of a device adapted for connection to said first or second port means, the time for initiation of venting being significantly increased with respect to the time for the piston means to close the first port due to said buffer volume.

* * * * *